(12) United States Patent
Uno (10) Patent No.: US 12,525,078 B2
(45) Date of Patent: Jan. 13, 2026

(54) VEHICLE ALERT SYSTEM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 18/407,629

(22) Filed: Jan. 9, 2024

(65) Prior Publication Data

US 2024/0304045 A1      Sep. 12, 2024

(30) Foreign Application Priority Data

Mar. 9, 2023   (JP) ................................. 2023-036577

(51) Int. Cl.
  *G07C 5/08*    (2006.01)
  *G07C 5/00*    (2006.01)

(52) U.S. Cl.
  CPC ............. *G07C 5/085* (2013.01); *G07C 5/008* (2013.01); *G07C 5/0808* (2013.01)

(58) Field of Classification Search
  CPC ...... G07C 5/085; G07C 5/008; G07C 5/0808; B60W 40/02; B60W 50/14; B60W 2050/146
  See application file for complete search history.

(56) References Cited

U.S. PATENT DOCUMENTS

2020/0098203 A1    3/2020  Uno
2024/0336273 A1*  10/2024  Wuorinen ....... B60W 60/00182

FOREIGN PATENT DOCUMENTS

JP    2020-052607 A    4/2020

* cited by examiner

*Primary Examiner* — Michael V Kerrigan
(74) *Attorney, Agent, or Firm* — SoraIP, Inc.

(57) ABSTRACT

An acquisition unit that acquires target vehicle data including information on the activation of warning light displays in a predetermined target vehicle and/or predetermined operations by the driver of the target vehicle; and the number of activations of warning light displays acquired by the acquisition unit and/or the predetermined operations. and a determination unit that determines whether the activation of the warning light display and/or the occurrence of the predetermined operation is due to submergence of the target vehicle based on the number of occurrences of the warning light display.

5 Claims, 6 Drawing Sheets

VEHICLE ALERT SYSTEM

CROSS-REFERENCE TO RELATED APPLICATION

This application claims priority to Japanese Patent Application No. 2023-036577 filed on Mar. 9, 2023, incorporated herein by reference in its entirety.

BACKGROUND

1. Technical Field

The present disclosure relates to an information processing system.

2. Description of Related Art

Japanese Unexamined Patent Application Publication No. 2020-052607 (JP 2020-052607 A) discloses an information processing system that acquires position information when unstable behavior such as a slip has occurred in a target vehicle, and sequentially collects the acquired position information in a server in association with information on the cause of the unstable behavior.

SUMMARY

It is assumed that an artificial intelligence (AI) model is used to estimate whether a warning light display that has been activated (hereinafter also simply referred to as warning light activation) in a predetermined target vehicle can be reproduced in other target vehicles, and the other target vehicles are cautioned based on an estimation result. In order to improve the accuracy of the reproduction estimation of the warning light activation, it is important to optimize a feature amount of the reproduction estimation. In this case, it is considered effective to specify whether the warning light activation or a driver operation that has occurred in a predetermined target vehicle is due to flooding. That is, it is desired to effectively determine whether a warning light activation or driver operation occurring in a predetermined target vehicle is due to flooding.

An object of the technology of the present disclosure is to effectively determine whether a predetermined target vehicle is flooded.

An information processing system according to the present disclosure includes:
an acquisition unit that acquires target vehicle data including information on either or both of activation of a warning light display in a predetermined target vehicle and a predetermined operation by a driver of the target vehicle; and
a determination unit that determines whether either or both of the activation of the warning light display and occurrence of the predetermined operation are due to flooding of the target vehicle, based on either or both of the number of times of the activation of the warning light display and the number of times of the occurrence of the predetermined operation that are acquired by the acquisition unit.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The information processing system according to this embodiment will be described below with reference to the drawings.

Overall Structure

Figure 1A:
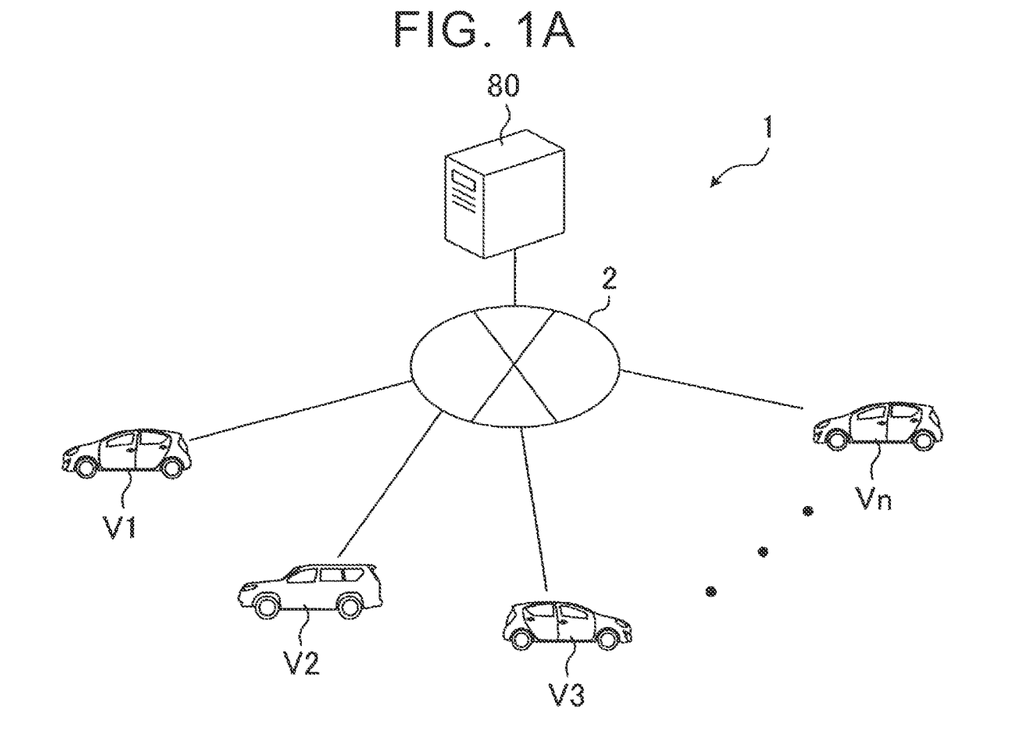
FIG. 1A is a schematic diagram illustrating the information processing system of the present disclosure.

As shown in FIG. 1A, the information processing system 1 includes a plurality of target vehicles V1 to Vn and an information processing server 80. The plurality of target vehicles V1 to Vn and the information processing server 80 are connected to each other via the network 2 so as to be able to communicate with each other. Network 2 is, for example, a wireless communication network.

The target vehicles V1 to Vn are vehicles from which the information processing server 80 collects information. The target vehicles V1 to Vn do not need to have the same configuration, but may be vehicles that have at least the function of displaying various warning lights on the meter panel or the like. The target vehicles V1 to Vn also include support target vehicles to which the information processing server 80 performs support control such as alerting. Hereinafter, the plurality of target vehicles V1 to Vn will also be simply referred to as "target vehicles V."

The information processing server 80 is, for example, a server device installed in a cloud computing system, data management center, etc. of a management company. Based on the information collected from the target vehicle V, the information processing server 80 determines whether the warning light display or driver operation activated in a predetermined target vehicle V is due to flooding. In addition, the information processing server 80 estimates whether the flooding scene will be reproduced in other target vehicles V based on the determination result, and provides support such as alerting other target vehicles V based on the reproduction estimation result. Take control.

Figure 1B:
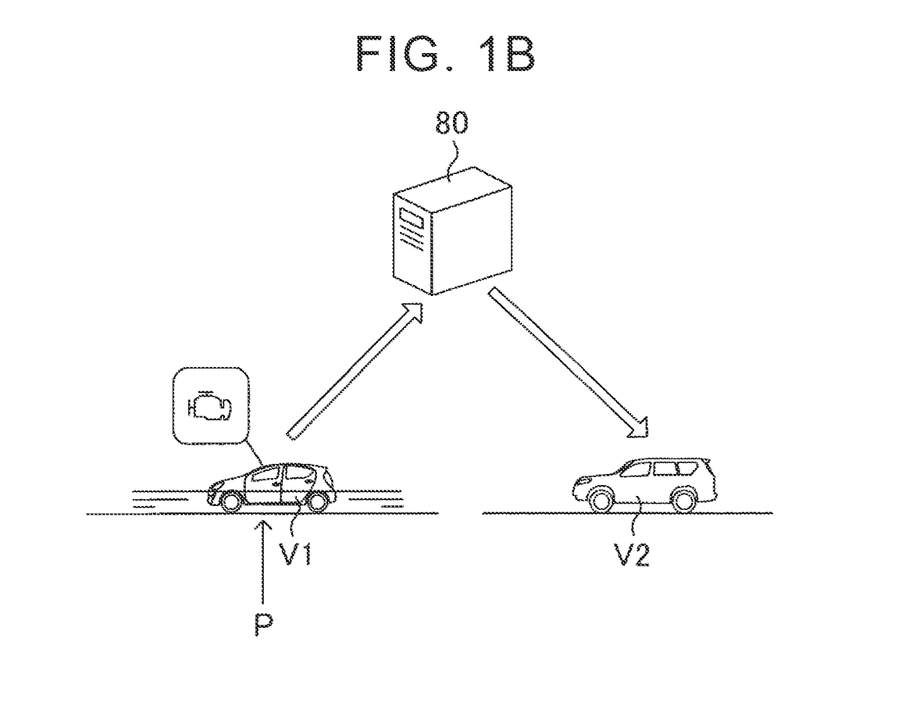
FIG. 1B is a schematic diagram illustrating the information processing system of the present disclosure.

FIG. 1B is a schematic diagram illustrating an example of the flow of information processing. As shown in FIG. 1B, it is assumed that, for example, an engine warning light display is activated in the target vehicle V1 due to the target vehicle V1 being submerged in water. In this case, the target vehicle V1 transmits various data including the position P where the engine warning light display was activated to the information processing server 80. For example, when another target vehicle V2 running behind the target vehicle V1 approaches position P, the information processing server 80 estimates whether the warning light operation will be reproduced in the target vehicle V2. When the information processing server 80 estimates that the warning light activation will be reproduced in the target vehicle V2, it performs support control such as alerting on the target vehicle V2. This makes it possible to suppress the target vehicle V2 from flooding.

Target Vehicle Configuration

Figure 2:
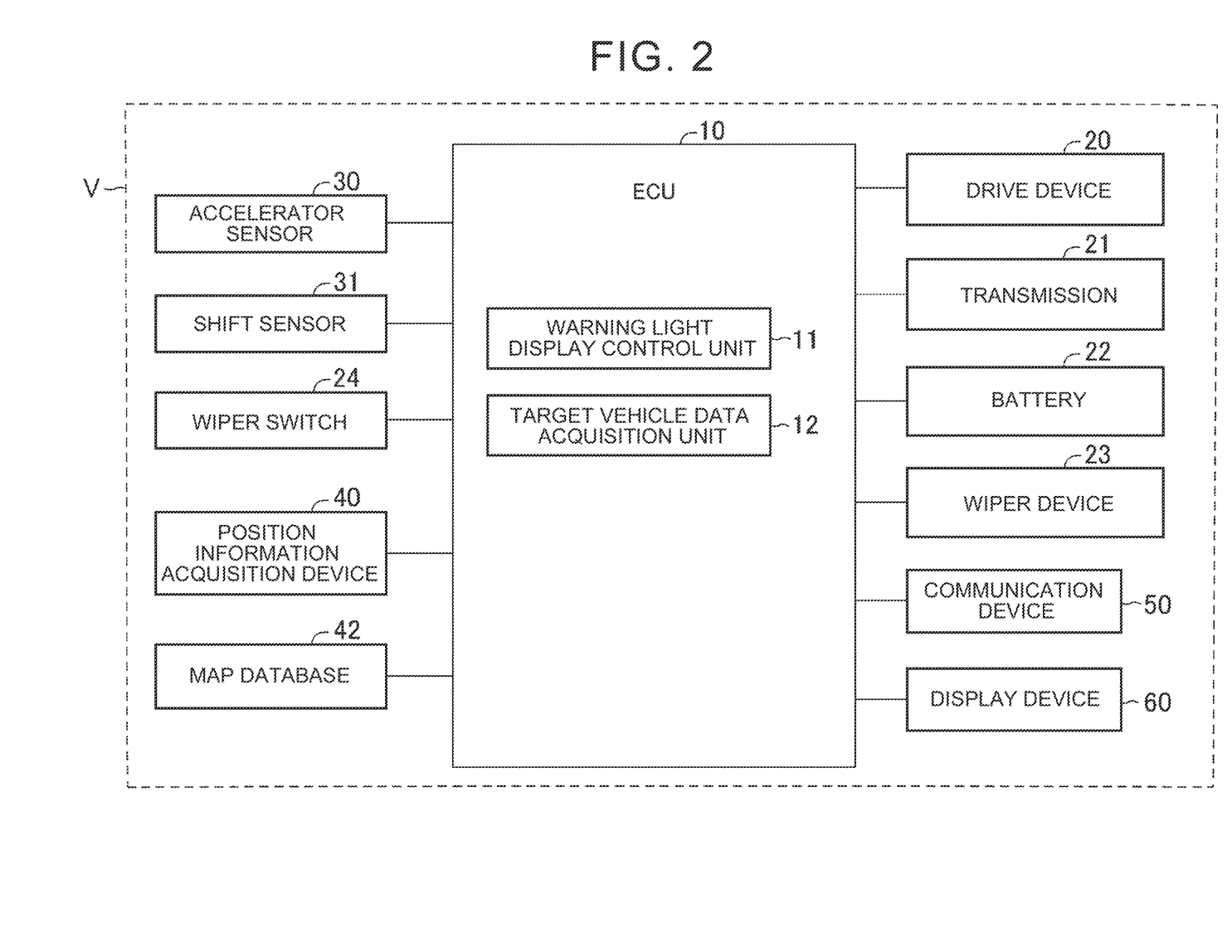
FIG. 2 is a schematic diagram illustrating a target vehicle of the present disclosure.

FIG. 2 is a schematic diagram showing the hardware configuration and software configuration of the target vehicle V. The target vehicle V is given an identification number (vehicle ID) for identifying the target vehicle V. The target vehicle V has an Electronic Control Unit (ECU) 10. ECU 10 includes a Central Processing Unit (CPU), Read Only Memory (ROM), Random Access Memory (RAM), etc. The CPU is a processor that executes various programs stored in the ROM. The ROM is a nonvolatile memory that stores data and the like necessary for the CPU to execute various programs. The RAM is a volatile memory and provides a work area in which various programs are expanded when executed by the CPU.

The ECU 10 is a central device that performs various controls of the target vehicle V, such as controlling the display of warning lights, for example. The ECU 10 includes a drive device 20, a transmission 21, a battery 22, a wiper device 23, a wiper switch 24, an accelerator sensor 30, a shift sensor 31, a position information acquisition device 40, a map database 42, a communication device 50, a display device 60, etc. is connected.

The drive device 20 generates a driving force to be transmitted to the driving wheels of the target vehicle V. Examples of the drive device 20 include an engine and an electric motor. In the present embodiment, the target vehicle V may be any of an engine vehicle, a hybrid electric vehicle (HEV), a plug-in hybrid vehicle (PHEV), a fuel cell electric vehicle (FCEV), and a battery electric vehicle (BEV).

The transmission 21 changes the speed of the rotational power output from the drive device 20 at a predetermined gear ratio and transmits it to the driving wheels. Note that when the target vehicle V is, for example, a BEV, the target vehicle V may or may not be equipped with the transmission 21.

The battery 22 stores electric power and supplies the stored electric power to various devices of the target vehicle V. When the target vehicle V is an engine vehicle, the battery 22 stores electric power generated by an alternator (not shown). Further, when the target vehicle V is an HEV, PHEV, BEV, etc., the battery 22 stores electric power generated by the electric motor of the drive device 20. Further, when the target vehicle V is a PHEV, BEV, etc., the battery 22 can store electric power supplied from an external power source.

The wiper device 23 wipes the outer surface of the windshield (not shown) of the target vehicle V. The wiper device 23 is activated when a wiper switch 24 is operated by an occupant (for example, a driver) of the target vehicle V. The wiper switch 24 is configured to be able to be selectively operated in a plurality of operating positions such as an OFF position where the wiper device 23 is not activated, an AUTO position where the wiper device 23 is activated when a rain sensor (not shown) detects raindrops, a LOW position where the wiper device 23 is activated at low speed, and a HIGH position where the wiper device 23 is operated at high speed. The wiper switch 24 transmits a signal to the ECU 10 according to the operating position. ECU 10 controls the operation of wiper device 23 according to the received signal. Hereinafter, the signal sent to the ECU 10 when the wiper switch 24 is operated to the HIGH position will be referred to as a "wiper HIGH signal." The operation of the wiper switch 24 to the HIGH position by the occupant is an example of the predetermined operation of the present disclosure.

The accelerator sensor 30 detects depression of an accelerator pedal (not shown) by the driver (accelerator ON). The shift sensor 31 detects operating positions of a shift operating device (not shown) of the transmission 21 (parking position P, reverse position R, neutral position N, drive position D, low speed gear position L, etc.). Each sensor 30, 31 transmits a detection result to ECU 10 at a predetermined period.

The position information acquisition device 40 acquires current position information of the target vehicle V. As the position information acquisition device 40, for example, a Global Positioning System (GPS) included in a navigation device can be used. The position information acquisition device 40 transmits the acquired current position information of the target vehicle V to the ECU 10 at a predetermined period.

The map database 42 is a database of map information, and is stored in a storage device included in the target vehicle V. The map information includes the positions of roads, intersections, etc., the shape of the roads, and the like. Note that the target vehicle V only needs to be able to transmit the location information acquired by the position information acquisition device 40 to the information processing server 80, and may be a vehicle that does not include the map database 42. If the target vehicle V does not include the map database 42, the target vehicle V may use the communication device 50 to acquire map information from an external server (for example, the information processing server 80).

The communication device 50 is a communication device for the target vehicle V to communicate with an external device, and transmits and receives various information via the network 2. The communication device 50 transmits various information to the information processing server 80 in response to commands from the ECU 10.

The display device 60 is, for example, a display device such as a meter panel. The display device 60 displays various warning lights (engine warning light, battery warning light, etc.).

Next, the software configuration of ECU 10 will be explained. The ECU 10 includes a warning light display control unit 11, a target vehicle data acquisition unit 12, and the like as functional elements. Each of these functional elements is realized by the CPU of the ECU 10 reading a program stored in the ROM into the RAM and executing it. Note that each functional element can also be provided in another ECU separate from the ECU 10. Furthermore, all or part of each functional element may be provided in the information processing server 80.

The warning light display control unit 11 controls a warning light display for displaying a warning light corresponding to the event to be warned when it is detected that an event to be warned to the occupants of the target vehicle V has occurred in the target vehicle V. The signal is output to the display device 60. Here, examples of events that should be warned include an abnormality in the drive device 20, an abnormality in a charging system such as the battery 22, and the like.

When the target vehicle V is an engine vehicle, the warning light display control unit 11 displays an "engine warning light" indicating the abnormality when an abnormality occurs in the drive system such as the engine, intake/exhaust system sensor, or transmission. A warning light display signal is output to the display device 60. In addition, when the target vehicle V is an HEV, BEV, etc., the warning light display control unit 11 displays an "HV system warning light" or "EV system warning light" that indicates the abnormality when an abnormality occurs in the drive system including the electric motor. A warning light display signal for displaying the following information is output to the display device 60. Hereinafter, the "engine warning light," "HV system warning light," "EV system warning light," etc. may be collectively referred to as "drive system warning light." Furthermore, when an abnormality occurs in the charging system for the battery 22, etc., the warning light display control unit 11 outputs a warning light display signal to the display device 60 to display a "battery warning light" indicating the abnormality in the charging system.

The target vehicle data acquisition unit 12 acquires target vehicle data that is data related to the target vehicle V. In this embodiment, the target vehicle data includes at least (1) vehicle ID, (2) position information, (3) wiper HIGH signal, (4) drive system warning light on, (5) battery warning light on, (6) Operation position of the shift operation device, (7) Accelerator ON, etc. are included. The target vehicle data acquisition unit 12 transmits the acquired target vehicle data to the information processing server 80 via the communication device 50 at predetermined intervals. Note that the target vehicle data may include failure information of a navigation device, various displays, electric parking brakes, headlamps, tail lamps, and the like.

Information Processing Server Configuration

Figure 3:
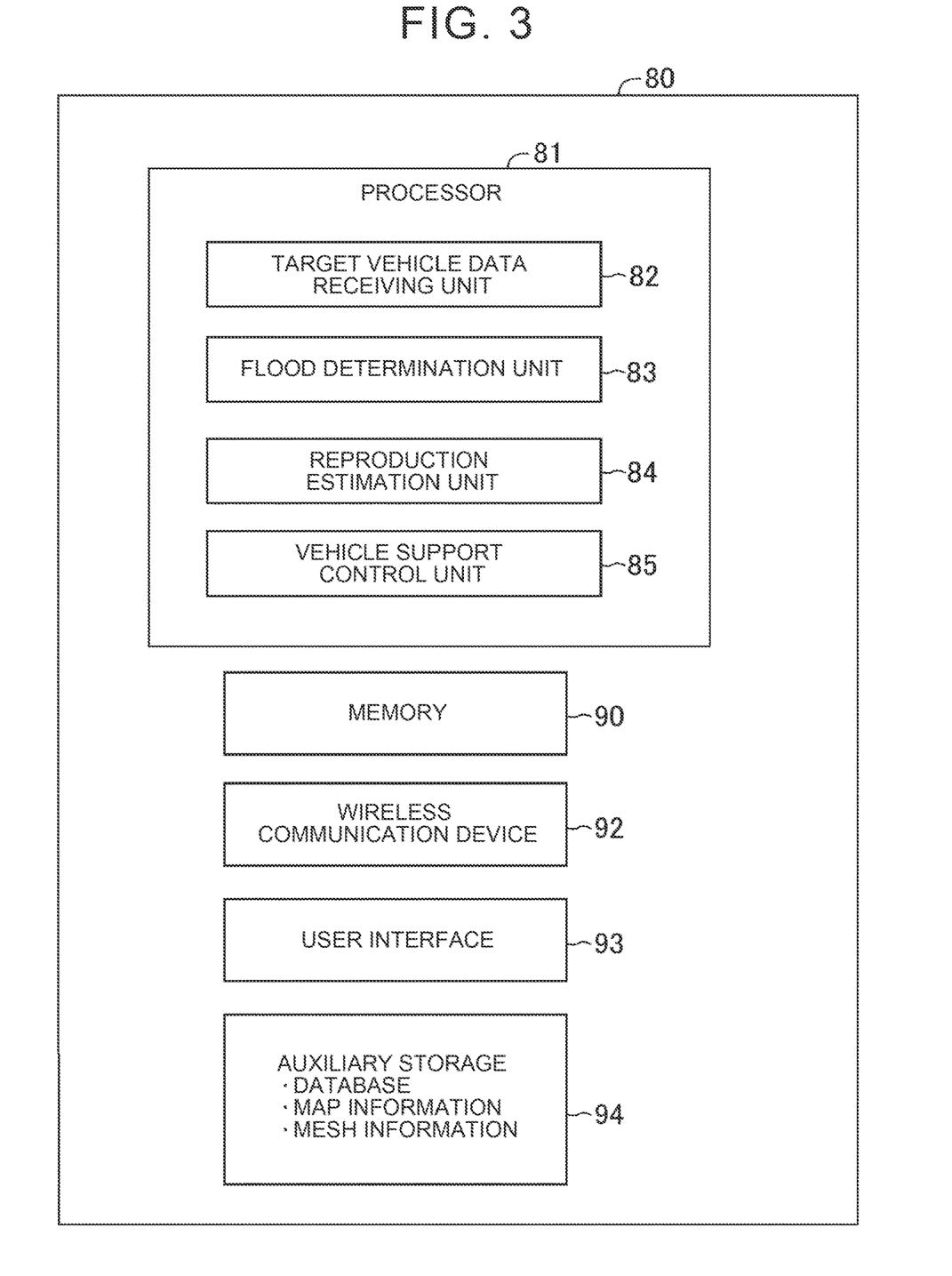
FIG. 3 is a schematic diagram illustrating the information processing server of the present disclosure.

As shown in FIG. 3, the information processing server 80 includes a processor 81 such as a CPU, and a memory 90 such as ROM or RAM. The CPU, ROM, and RAM form a so-called microcomputer. The information processing server 80 also includes a wireless communication device 92, a user interface 93, an auxiliary storage device 94, and the like.

Processor 81 executes various programs stored in auxiliary storage device 94. For example, a ROM of the memory 90 stores data and the like necessary for the processor 81 to execute various programs. For example, the RAM of the memory 90 provides a work area where various programs are expanded when executed by the processor 81. The wireless communication device 92 is a communication device for the information processing server 80 to perform wireless communication with the target vehicle V. The user interface 93 is an input device such as a touch panel or a keyboard, and an output device such as a display or a speaker. The auxiliary storage device 94 is an auxiliary storage device such as an HDD that stores various programs and data used when the various programs are executed. The auxiliary storage device 94 stores target vehicle data transmitted from the target vehicle V via the network N, thereby constructing a database of the target vehicle V. Further, the auxiliary storage device 94 stores in advance map information and information on meshes set on the map.

Figure 4:
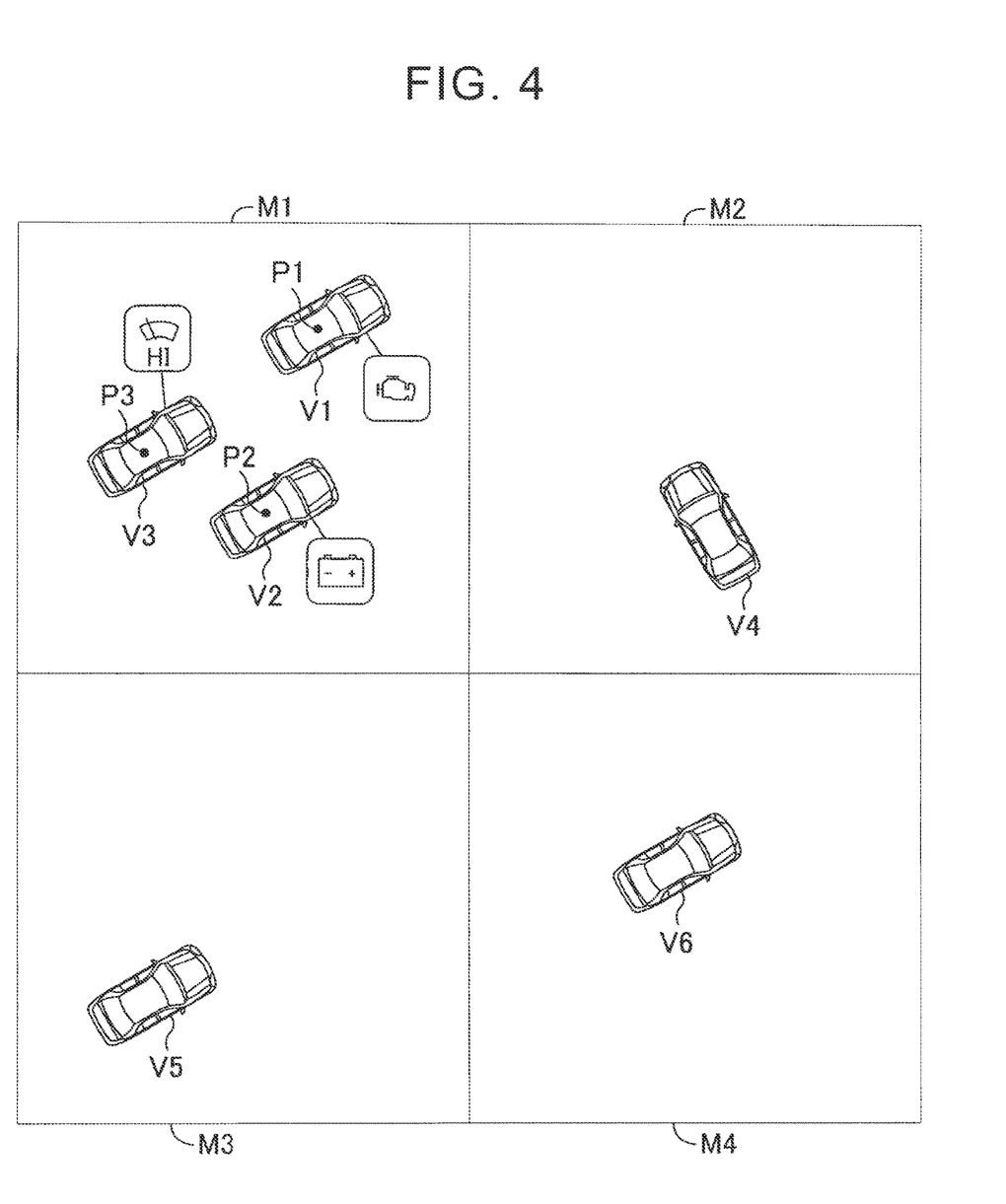
FIG. 4 is a schematic diagram illustrating an example of a mesh set on the map of the present disclosure.

FIG. 4 is a schematic diagram illustrating an example of a mesh set on a map. As shown in FIG. 4, the mesh M includes a plurality of meshes M1 to M4. The meshes M1 to M4 are set as, for example, 1 km square areas on the map. Each of the meshes M1 to M4 is given a mesh code for identifying the mesh. Note that the number of meshes M is not limited to four as shown in the illustrated example, but may be five or more, 100 or more, or three or less. The size of the mesh M is also not particularly limited, and may be a variable value that is reduced or enlarged depending on the city area, residential area, etc., river vicinity, time zone, etc. The shape of the mesh M is also not particularly limited, and may be a shape other than a square, such as a rectangle, a triangle, or a circle.

Here, the reason for using the meshes M1 to M4 will be explained. For example, as shown in FIG. 4, suppose that, within the area of the mesh M1, the engine warning light is turned on in the target vehicle V1, the battery warning light is turned on in the target vehicle V2, and the wiper switch 24 is operated to the HIGH position in the target vehicle V3. In this case, it is considered that the positions P1, P2, and P3 of these target vehicles V1, V2, and V3 do not match each other and vary to some extent. In such a case, by using meshes M1 to M4, it is possible to collectively manage the positions P1, P2, and P3 of multiple target vehicles V1, V2, and V3 in which warning light displays, etc. were activated within a predetermined distance range. This makes management more efficient than managing them individually.

Referring again to FIG. 3, the software configuration of the processor 81 will be described. As shown in FIG. 3, the processor 81 includes a target vehicle data receiving unit 82, a flooding determination unit 83, a reproduction estimation unit 84, a vehicle support control unit 85, and the like as functional elements.

The target vehicle data receiving unit 82 receives target vehicle data sequentially transmitted from the target vehicle V via the network 2. The target vehicle data transmitted from the target vehicle V includes at least the above-mentioned (1) to (7) acquired by the target vehicle data acquisition unit 12 (see FIG. 2). The target vehicle data receiving unit 82 sequentially stores the received target vehicle data in the auxiliary storage device 94 in association with the mesh code.

The flooding determination unit 83 determines whether the activation of a warning light display or the occurrence of a driver operation included in the target vehicle data is caused by the target vehicle V being flooded. Specifically, the flooding determination unit 83 determines whether (A) the wiper switch 24 is moved to the HIGH position, (B) the drive system warning light is turned on, (C) the battery warning light is turned on, and (D) the shift operating device is turned on. At a predetermined period for each mesh M1 to M4, it is determined whether the operation to the low speed gear position L or (E) the accelerator ON operation with the shift operating device being operated to the neutral position N is due to submergence of the target vehicle V. The predetermined period is not particularly limited, and may be, for example, a period of one minute, a period of less than one minute, or a period of one minute or more. The operations (A), (D), and (E) by the driver are examples of the predetermined operations of the present disclosure. The details of each item (A) to (E) will be explained below.

Regarding (A), the driver tends to operate the wiper device 23 at high speed (with the wiper switch 24 in the HIGH position) as a sign of flooding. The flooding determination unit 83 calculates the number of wiper HIGH signals (hereinafter referred to as wiper HIGH number n1) of each target vehicle V that have occurred within each mesh M1 to M4 from the latest to a predetermined time period (for example, several tens of minutes) before. Count. The flooding determination unit 83 determines that (A) is due to flooding when the count value of the wiper HIGH number n1 continues to be equal to or greater than the predetermined threshold number of cases X1 for a predetermined threshold time Tv or more. In this way, when high-speed operation of the wiper device 23 occurs not once but frequently, it is possible to effectively improve the accuracy of flooding determination by determining that the high-speed operation is due to flooding.

Regarding (B), among the vehicle abnormalities due to flooding, abnormalities in the drive system tend to occur most often due to water entering the engine or intake/exhaust system. The flooding determination unit 83 counts the number of times the drive system warning light is turned on (hereinafter referred to as the number of times the drive system warning light is turned on n2) in each of the meshes M1 to M4 during the period from the latest to a predetermined time ago. The flooding determination unit 83 determines (B) to be due to flooding when the count value of the drive system warning light ON number n2 continues to be equal to or greater than the predetermined threshold number of cases X2 for a predetermined threshold time Tv or more. In this way, when the drive system warning light is turned on not once but frequently, it is determined that these are caused by flooding, thereby effectively improving the accuracy of flooding determination.

Regarding (C), there is a tendency for an abnormality in the charging system to occur at the same time as an abnormality in the drive system as a vehicle abnormality due to flooding. The flooding determination unit 83 counts the number of times the battery warning light is turned on (hereinafter referred to as the number of battery warning lights turned on n3) in each of the meshes M1 to M4 during the period from the latest to a predetermined time before. The flooding determination unit 83 determines (C) to be due to flooding when the count value of the battery warning light ON number n3 continues to be equal to or greater than the predetermined threshold number of cases X3 for a predetermined threshold time Tv or more. In this way, when the battery warning light is turned on not once but frequently, it is determined that the turning on is due to flooding, thereby effectively improving the accuracy of the flooding determination.

Regarding (D), when the vehicle is running through a flooded waterway, the driver tends to frequently use the transmission 21 in a low gear in order to maintain the rotational speed of the drive device 20. The flooding determination unit 83 counts the number of operations of the shift operating device to the low-speed gear position L (hereinafter referred to as the number of low-speed gear operations n4) that occurred in each of the meshes M1 to M4 during the period from the latest to a predetermined time before. The flooding determination unit 83 determines (D) to be caused by flooding when the count value of the number of low-speed gear operations n4 continues to be equal to or greater than the predetermined threshold number of cases X4 for a predetermined threshold time Tv or more. In this way, when the driver's operation to the low speed gear position L occurs frequently rather than once, it is possible to effectively improve the accuracy of flooding determination by determining that the operation is due to flooding.

Regarding (E), in situations where the distance between the vehicle in front becomes short and the driver has to stop while driving through a flooded waterway, the driver should shift gears to suppress the engine from stalling due to water seepage from the intake and exhaust system. There are cases where the user frequently uses the operation of putting the transmission 21 in neutral and continuing to depress the accelerator pedal. The flooding determination unit 83 counts the number of accelerator ON operations during neutral N (hereinafter referred to as the number of neutral/accelerator operations n5) that have occurred in each of the meshes M1 to M4 during the period from the latest to a predetermined time before. The flooding determination unit 83 determines (E) to be caused by flooding if the count value of the number of neutral/accelerator operations n5 continues to be equal to or greater than a predetermined threshold number of cases X5 for a predetermined threshold time Tv or more. In this way, if the driver's accelerator ON operation during neutral N is not a single occurrence but occurs frequently, it is possible to effectively improve the accuracy of flood detection by determining that these are caused by flooding. become.

The reproduction estimation unit 84 execute the reproduction estimation to estimate whether the warning light activation is reproduced in the subsequent target vehicle V that reaches or approaches the meshes M1 to M4 within a certain period of time, by inputting the target vehicle data of the target vehicle V for each mesh M1 to M4 into the reproduction model. The certain period of time is not particularly limited, and may be less than 5 minutes or more than 5 minutes. Whether the subsequent target vehicle V will reach or approach the meshes M1 to M4 within a certain period of time may be estimated based on the temporal change in the position information of the target vehicle V. Reproduction estimation may be performed using, for example, a Convolutional Neural Network (CNN), or may be performed using a neural network other than CNN. The reproduction model may be generated off-line in advance and stored in the auxiliary storage device 94, or may be generated online at predetermined intervals for each of the meshes M1 to M4. The predetermined period is not particularly limited, and may be, for example, a period of 5 minutes, a period of less than 5 minutes, or a period of 5 minutes or more. The reproduction model may be generated using a well-known method for generating an AI model.

Here, in order to improve the accuracy of the reproduction estimation by the reproduction estimation unit 84, it is desirable to use a feature quantity that makes a large contribution to the estimation result. In the present embodiment, the reproduction estimation unit 84 characterizes the data determined by the flooding determination unit 83 to be caused by flooding among the above-mentioned data (A) to (E) received by the target vehicle data receiving unit 82. Used as a quantity. Thereby, it is possible to realize reproduction estimation using a feature quantity that greatly contributes to the estimation result, and it becomes possible to reliably improve the accuracy of reproduction estimation of warning light operation. When the reproduction estimation unit 84 estimates that the warning lamp operation will be reproduced in the target vehicle V within a certain period of time, the reproduction estimation unit 84 determines that the warning lamp operation is "reproduced". Furthermore, when the reproduction estimation unit 84 estimates that the warning light operation will not be reproduced in the target vehicle V within a certain period of time, the reproduction estimation unit 84 determines that the warning light operation is "not reproduced." The reproduction estimation unit 84 stores the estimation result in the auxiliary storage device 94 in association with the mesh code.

If there is a target vehicle V whose warning light operation is estimated to be "reproduced" by the reproduction estimation unit 84, the vehicle support control unit 85 selects the target vehicle V as the support target vehicle. Further, the vehicle support control unit 85 issues a warning to the selected support target vehicle through the wireless communication device 92 to notify that there is a possibility of flooding. The alert notification may be made by displaying on the display of the target vehicle V, or by audio notification from a speaker. In addition, when the vehicle to be supported is running fully automatically, the vehicle support control unit 85 detours the travel route of the vehicle to be supported from a position (mesh) where flooding is predicted to occur, or automatically Driving may be canceled.

Figure 5:
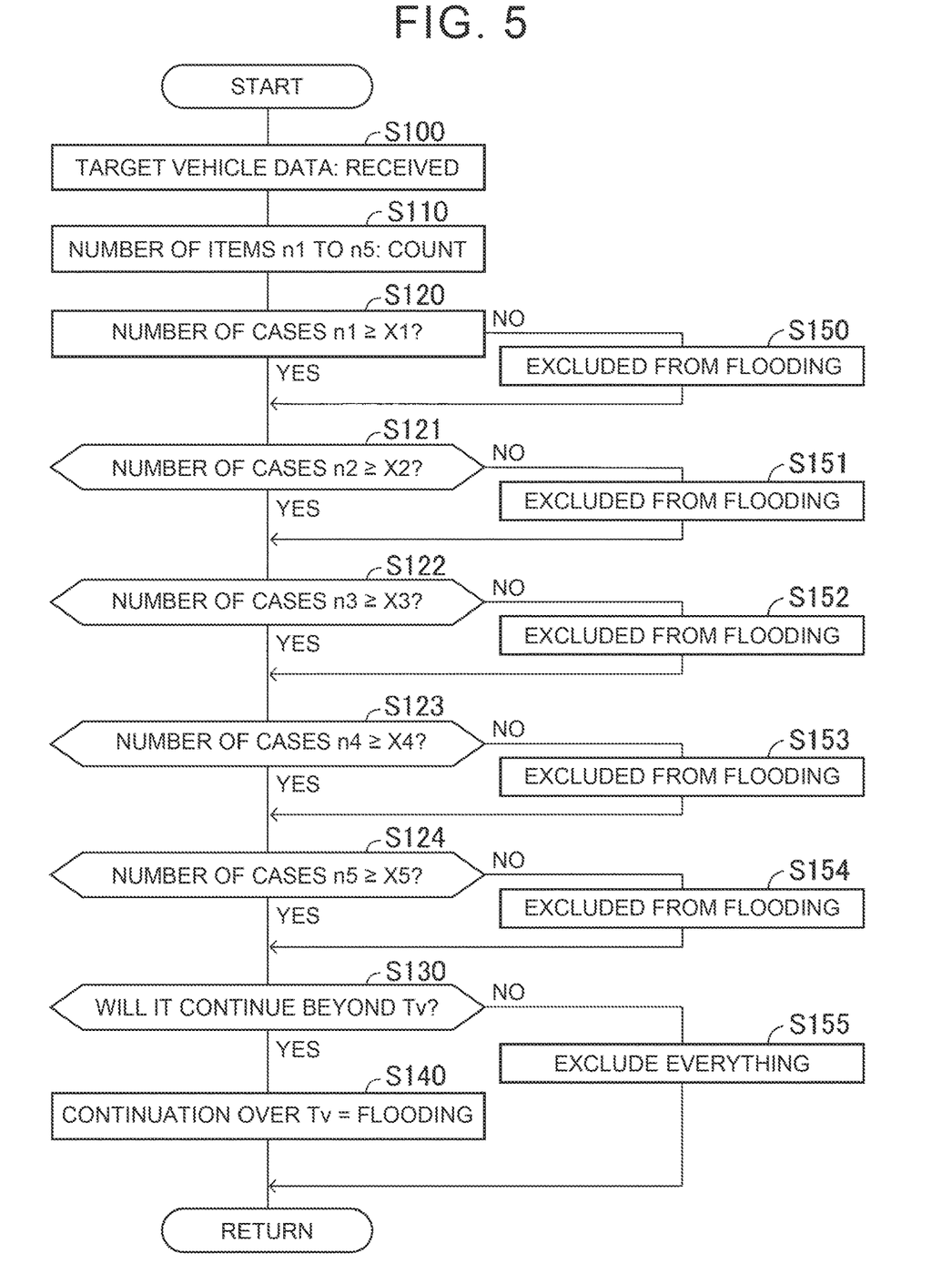
FIG. 5 is a flowchart illustrating a routine of flooding determination processing of the present disclosure.

Next, the routine of the flooding determination process according to this embodiment will be explained based on FIG. 5.

In S100, the processor 81 receives target vehicle data sequentially transmitted from the target vehicle V via the network 2, and stores it in the auxiliary storage device 94. The target vehicle data may be received, for example, at a cycle of 1 minute, a cycle of less than 1 minute, or a cycle longer than 1 minute.

Next, in S110, the processor 81 calculates the number of wiper HIGH events n1, the number of drive system warning light ON times n2, the number of battery warning light ON times n3, the number of low speed gear operations n4, and the number of neutral/accelerator operations n5 during the period from the latest to a predetermined time ago. is counted for each mesh M1 to M4.

In S120 to S124, the processor 81 compares the number of cases n1 to n5 counted in S110 with the threshold number of cases X1 to X5. Note that each process from S120 to S124 may be performed in any order and may be performed simultaneously, but will be explained in order below.

In S120, the processor 81 determines for each mesh M1 to M4 whether the wiper HIGH number n1 is equal to or greater than a predetermined threshold number of cases X1. If the wiper HIGH number n1 is equal to or greater than the predetermined threshold number of cases X1 (Yes), the processor 81 proceeds to the process of S121. On the other hand, if the wiper HIGH number n1 is less than the predetermined threshold number of cases X1 (No), the processor 81 proceeds to the process of S150, excludes the wiper HIGH signal from the flooding determination, and proceeds to the process of S121.

In S121, the processor 81 determines for each of the meshes M1 to M4 whether the drive system warning light ON number n2 is equal to or greater than a predetermined threshold number of cases X2. If the drive system warning light ON number n2 is equal to or greater than the predetermined threshold number of cases X2 (Yes), the processor 81 proceeds to the process of S122. On the other hand, if the drive system warning light ON number n2 is less than the predetermined threshold number of cases X2 (No), the processor 81 proceeds to the process of S151, excludes the ON of the drive system warning light from the flooding determination, and proceeds to the process of S122.

In S122, the processor 81 determines for each mesh M1 to M4 whether the battery warning light ON number n3 is equal to or greater than a predetermined threshold number of cases X3. If the battery warning light ON number n3 is equal to or greater than the predetermined threshold number of cases X3 (Yes), the processor 81 proceeds to the process of S123. On the other hand, if the battery warning light ON number n3 is less than the predetermined threshold number of cases X3 (No), the processor 81 proceeds to the process of S152, excludes the battery warning light ON from the flood determination, and proceeds to the process of S123.

In S123, the processor 81 determines for each mesh M1 to M4 whether the number n4 of low-speed gear operations is equal to or greater than a predetermined threshold number of cases X4. If the number n4 of low-speed gear operations is equal to or greater than the predetermined threshold number of cases X4 (Yes), the processor 81 proceeds to the process of S124. On the other hand, if the number n4 of low-speed gear operations is less than the predetermined threshold number of cases X4 (No), the processor 81 proceeds to the process of S153, excludes the operation to the low-speed gear position L from the flooding determination, and proceeds to the process of S124.

In S124, the processor 81 determines for each mesh M1 to M4 whether the number n5 of neutral/accelerator operations is equal to or greater than a predetermined threshold number of cases X5. If the number n5 of neutral/accelerator operations is equal to or greater than the predetermined threshold number of cases X5 (Yes), the processor 81 proceeds to the process of S130. On the other hand, if the number n5 of neutral/accelerator operations is less than the predetermined threshold number X5 (No), the processor 81 proceeds to the process of S154, excludes the accelerator ON operation during neutral N from the flooding determination, and proceeds to the process of S130.

In S130, the processor 81 determines whether the positive determination result (Yes) in each process of S120 to S124 continues for a predetermined threshold time Tv or more. If there is a positive determination result that continues for longer than the threshold time Tv (Yes), the processor 81 proceeds to step S140. On the other hand, if there is no positive determination result that continues for longer than the threshold time Tv (No), the processor 81 proceeds to the process of S155, excludes all of them from the flooding determination, and ends this routine.

In S140, the processor 81 determines that a positive determination result that continues for a threshold time Tv or longer is caused by flooding of the target vehicle V, and stores the determination result in the auxiliary storage device 94 in association with the mesh code. Then, return to this routine.

Figure 6:
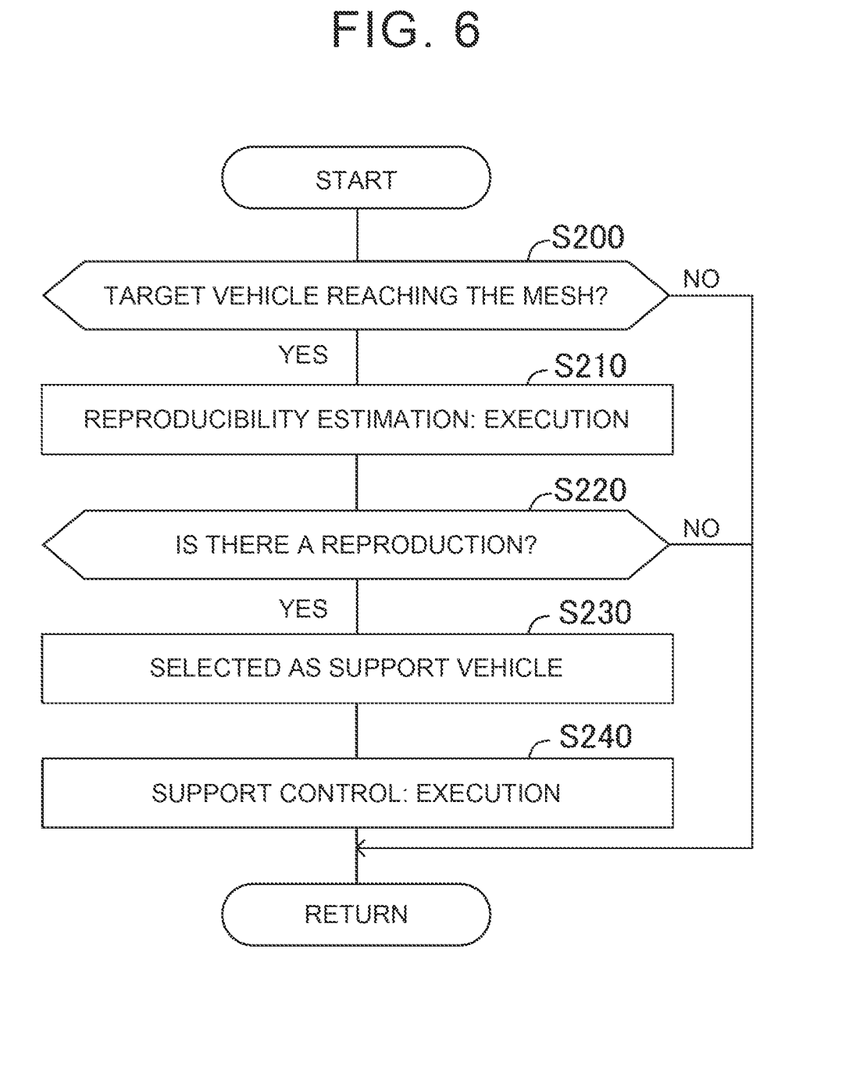
FIG. 6 is a flowchart illustrating a routine of reproduction estimation processing and support control processing of the present disclosure.

Next, based on FIG. 6, the routine of the warning light activation reproduction estimation process and the support control process will be described.

In S200, the processor 81 causes the mesh M (hereinafter referred to as the target mesh M) for which the activation of the warning light display or the occurrence of the driver's operation is determined to be due to flooding within a certain period of time by the above-mentioned flooding determination process (see FIG. 5). It is determined whether there is a target vehicle V reaching or approaching. If there is a target vehicle V that will reach or approach the target mesh M within a certain period of time (Yes), the processor 81 proceeds to the process of S210. On the other hand, if there is no target vehicle V that reaches or approaches the target mesh M within a certain period of time (No), the processor 81 returns this routine without executing the reproduction estimation.

In S210, the processor 81 inputs the target vehicle data of the target vehicle V into the reproduction model to perform reproduction estimation of the warning light operation. At this time, the processor 81 executes reproduction estimation using the target vehicle data determined to be caused by flooding by the above-mentioned flooding determination process (see FIG. 5) as a feature amount. Next, in S220, the processor 81 determines whether the estimated result of warning light activation is "recurrence". If the estimation result is not "reproduced" (No), the processor 81 returns this routine without executing support control. On the other hand, if the estimation result is "reproduced" (Yes), the processor 81 proceeds to the process of S230. In S230, the processor 81 selects the target vehicle V whose warning light activation is estimated to be "reproduced" as the support target vehicle. Next, in S240, the processor 81 executes support control such as alerting the support target vehicle, and then returns to this routine.

Note that the present disclosure is not limited to the above-described embodiments, and various modifications can be made without departing from the purpose of the present disclosure.

For example, the flooding determination unit 83 has been described as determining whether the occurrences of (A) to (E) above are due to flooding of the target vehicle V, but it may be possible to determine whether the occurrences of (A) to (E) above are due to flooding of the target vehicle V; It is also possible to add abnormalities in the electric parking brake, headlamps, tail lamps, etc. to the flood detection criteria. Further, it is also possible to use information posted by the occupant of the target vehicle V using Social Networking Service (SNS) etc. as the flood determination item. Further, although the routines of each process by the processor 81 have been individually explained using FIGS. 5 and 6, the flooding determination process shown in FIG. 5 executes the reproduction estimation in the reproduction estimation processing routine shown in FIG. 6. It is also possible to execute it at any time. Furthermore, although the reproduction estimation unit 84 has been described as reproducing and estimating the activation of the warning light in a predetermined target vehicle V based on the flood determination result, it also estimates whether the flood scene will be reproduced in a predetermined target vehicle V. It is also possible.

What is claimed is:

1. A vehicle alert system comprising:
   vehicles each including a warning light display and at least one of a notification display and a speaker; and
   a server including a processor, wherein
   each of the vehicles is configured to transmit vehicle data including information regarding either or both of activation of the warning light display and a predetermined operation by a driver, and
   the processor is configured to
      determine, based on the vehicle data, that the activation of the warning light display is due to flooding when a first number of times of the activation continues to be equal to or greater than a first threshold value for a first threshold time,
      determine, based on the vehicle data, that the predetermined operation is due to the flooding when a second number of times of the predetermined operation continues to be equal to or greater than a second threshold value for a second threshold time, and
      when the processor determines that at least one of the activation of the warning light display and the predetermined operation of a first vehicle among the vehicles is due to the flooding, issue a warning to a second vehicle among the vehicles by the at least one of the notification display and the speaker.

2. The vehicle alert system according to claim 1, wherein the processor is configured to estimate whether the activation of the warning light display or the predetermined operation is reproducible in the second vehicle using either or both of the activation of the warning light display and the predetermined operation that are determined to be due to the flooding.

3. The vehicle alert system according to claim 1, wherein each of the vehicles includes a drive device, a battery, and a wiper device,
   the warning light display indicates either or both of an abnormality in the drive device and an abnormality in the battery, and
   the predetermined operation is operating the wiper device at high wiper speed.

4. The vehicle alert system according to claim 1, wherein each of the vehicles includes a transmission, and
   the predetermined operation is shifting the transmission to low gear.

5. The vehicle alert system according to claim 1, wherein each of the vehicles includes a transmission and an accelerator pedal, and
   the predetermined operation is setting the transmission to neutral and depressing the accelerator pedal.

* * * * *